No. 848,092. PATENTED MAR. 26, 1907.
A. F. EELLS.
SEA SOUNDING.
APPLICATION FILED FEB. 23, 1907.

2 SHEETS—SHEET 1.

Albert F. Eells, Inventor

Witnesses

UNITED STATES PATENT OFFICE.

ALBERT F. EELLS, OF BOSTON, MASSACHUSETTS.

SEA-SOUNDING.

No. 848,092.  Specification of Letters Patent.  Patented March 26, 1907.

Application filed February 23, 1907. Serial No. 358,924.

*To all whom it may concern:*

Be it known that I, ALBERT F. EELLS, a citizen of the United States, residing at Boston, in the county of Suffolk and State of Massachusetts, and whose post-office address is 101 Commercial street, in said city, have invented certain new and useful Improvements in Sea-Sounding, of which the following is a specification.

The present invention has for its objects, among others, to provide simple and efficient means for determining the depth of the water between the ship's keel and the bottom of the body of water through which the ship is passing and to automatically and electrically indicate the same in the pilot-house or other desired point on board the vessel.

The invention comprises, broadly, a device for determining the depth of the water by producing a sound within the submerged portion of the vessel, which sound passes through the material of the vessel and enters the surrounding water and is received back again into the vessel through the material of the latter and through a transmitter in contact with the submerged portion of the vessel and thence by electric wires to a receiver, the volume of the sound being indicated by suitable instrument, as a galvanometer. I may sometimes provide a signal, either visual or audible, actuated by the galvanometer to give notice when the water is of only a predetermined depth.

Other objects and advantages of the invention will hereinafter appear, and the novel features thereof will be specifically defined by the appended claims.

The invention in its preferred form is clearly illustrated in the accompanying drawings, in which—

Figure 1:
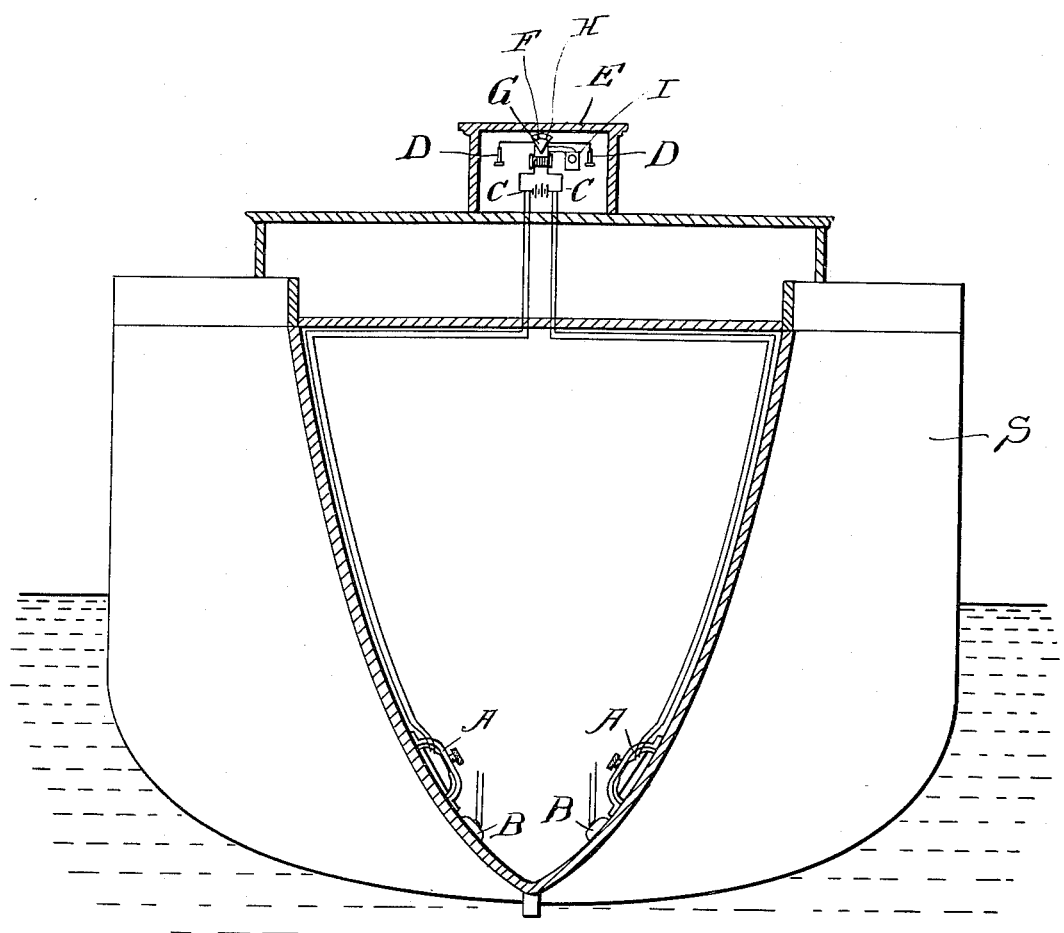
Figure 2:
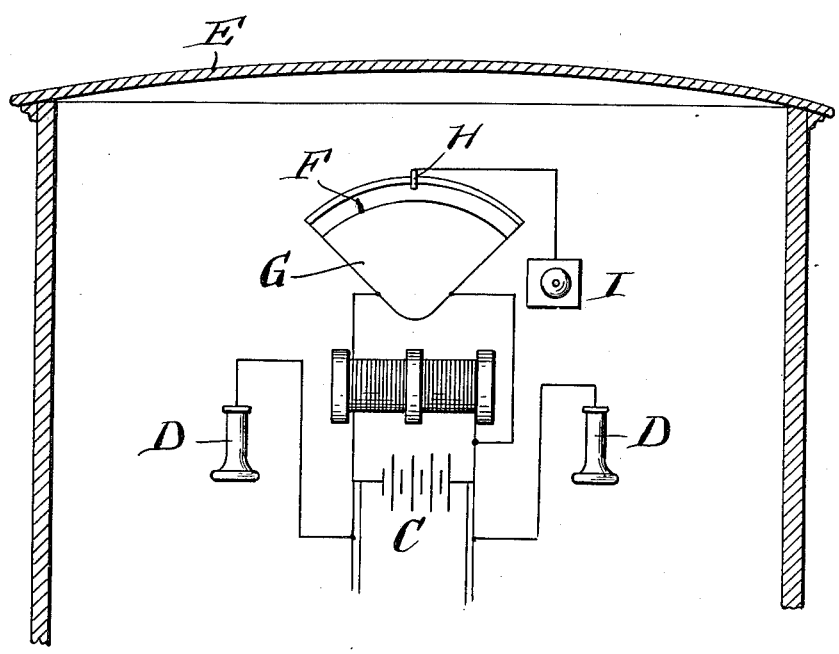

Figure 1 represents a front view of a vessel with the forward body in vertical section. Fig. 2 is an enlarged cross-section of the pilot-house shown in Fig. 1 and showing more clearly the receiving and indicating mechanism.

I have found by experiment that sound produced within a vessel is very indistinct in deep waters, but grows louder as the water grows more shoal, and that by means of a transmitter secured to the frame or shell of the vessel within its submerged portion this sound is receivable and can be conveyed to the pilot-house, where by the volume of the sound the depth of the water may be determined and by a galvanometer or other suitable instrument the depth can be indicated. The present invention contemplates the broad embodiment of this idea.

Referring to the drawings, S designates the vessel, and E the pilot-house thereof.

B is a sound-producing device, as an electric hammer of known construction, actuated in the usual way, the wires being shown as broken off. This serves to make a continuous sound within the submerged portion of the vessel. This sound travels through the wall of the vessel into the surrounding water, possibly to the bottom of the sea, and is echoed back through the wall of the ship and is received by a transmitter A, which is secured to the frame or shell of the vessel in any suitable manner and is preferably hermetically sealed to exclude moisture and to prevent injury to the same by condensation. This transmitter is connected by wires through the battery C and the magnet shown to the receiver D, which may be an ordinary telephone-receiver.

G is a suitable instrument, as a galvanometer suited to the purpose, properly connected, and which serves to indicate the volume of the sound—the shallower the water the louder the sound.

I may sometimes provide a signal, as a bell I, electrically connected and adapted to be set in operation by the pointer F of the galvanometer striking a contact H, which may be set at any desired point, so that when the water reaches a predetermined minimum depth the finger striking this contact will complete an electric circuit and sound the alarm. A light may be substituted for the bell, or both may be employed, one for day and the other for night.

One or more sounders and sound-receiving devices may be employed and also more than one receiver, and the transmitter employed is preferably one having a solid back with a granular carbon disk.

What is claimed as new is—

1. The method of determining the depth of water which consists in generating sound-waves, receiving them on an electric transmitter and then noting the loudness to determine the depth.

2. The method of determining the depth of water, which consists in generating sound-waves, receiving the same on an electric transmitter, and automatically indicating the depth.

3. The method of determining the depth of water, which consists in generating sound-waves, receiving them on an electric transmitter, automatically indicating the depth and automatically actuating a signal when a predetermined minimum depth has been reached.

4. A sea-sounding apparatus comprising means for generating sound-waves and means for electrically noting the volume of the sound to determine the depth of water.

5. A sea-sounding apparatus comprising a vessel, means therein for generating sound-waves, a hermetically-sealed electric transmitter within the submerged portion of said vessel and means for noting through said transmitter the volume of the sound and the depth of the water.

6. A sea-sounding apparatus comprising therein means for electrically generating sound-waves, an electric transmitter affixed to a submerged portion of said vessel, means for electrically indicating the depth and for sounding an alarm.

7. A sea-sounding apparatus comprising a vessel, means therein for generating sound-waves, a hermetically-sealed transmitter secured within the submerged portion of said vessel, a receiver electrically connected with said transmitter, and means for automatically indicating the depth of the water by volume of sound.

8. A vessel, a hermetically-sealed electric transmitter secured within and directly in contact with the submerged portion of said vessel and a receiver electrically connected with said transmitter.

Signed by me at Washington, District of Columbia, this 23d day of February, 1907.

ALBERT F. EELLS.

Witnesses:
W. REES EDELEN,
A. W. HART.